INVENTORS
Allen L. Everitt
James E. Frederick
BY Clarence A. Mayer, Jr.

Their Attorney

United States Patent Office 2,879,090
Patented Mar. 24, 1959

2,879,090

RESILIENT MOUNTING MEANS FOR ABSORBING AXIAL AND LATERAL THRUSTS

Allen L. Everitt, James E. Frederick, and Clarence A. Mayer, Jr., Dayton, Ohio, assignors to General Motors Corporation, Detroit, Mich., a corporation of Delaware Application May 24, 1957, Serial No. 661,354

5 Claims. (Cl. 287—85)

This invention relates to bushings and is particularly concerned with resilient bushings and related parts, togethed with methods for making said bushings.

It is the primary object of this invention to provide a new and improved flanged type of resilient bushing wherein the torsional and axial rates of deflection of the bushing are substantially independently controlled so that bushings having the desired rates may be easily manufactured.

In carrying out this object, it is a further object of the invention to provide a bushing having inner and outer flanged metal sleeves wherein the sleeve portions are held in spaced relation by a preloaded elastomeric member in a state of compression therebetween. A second elastomeric member independent of the first mentioned member is interposed between the flanged portions of said sleeves for effecting control of the axial rate of deflection of the bushing. This second elastomeric member may be lubricated with respect to one or both of the metal sleeves so as to have little or no effect on the torsional rate of the bushing.

A further object of the invention is to maintain the bushing in assembled relation by proper preloading and compression of the first mentioned elastomeric member, whereby the second mentioned elastomeric member is held in a state of compression thereby if desired.

Further objects and advantages of the present invention will be apparent from the following description, reference being had to the accompanying drawings wherein preferred embodiments of the present invention are clearly shown.

Figure 1:
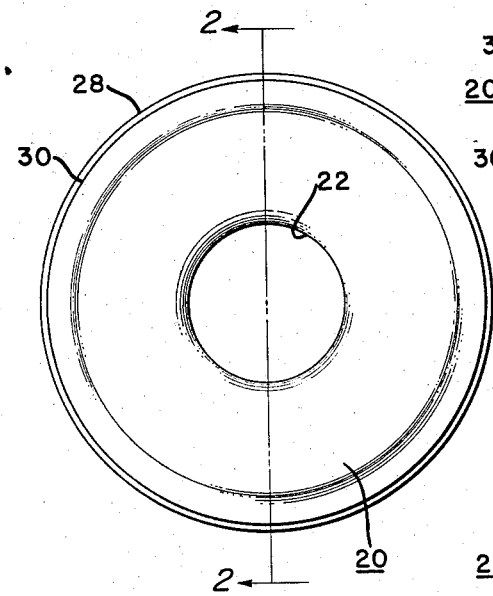
Figure 1 is a plan view of a bushing.

Bushings as described in the present invention are manufactured and assembled by means of techniques clearly set forth in copending application S.N. 452,755, assigned to the assignee of the present invention. In this application, specific preloading of the elastomeric member is set forth for accomplishing equal distribution and flow of the elastomeric part, whereby the compression and preload of the elastomeric part is equalized with respect to the inner and outer metal sleeves, whereby the bushing in its assembled condition has no tendency to become disassembled and wherein the bushing yields improved deflection control because of the uniform loading of the elastomeric portions thereof.

The present invention, as noted in the drawings, is directed in its entirety to flanged-type bushings, such as are used in connection with control arms of automotive suspensions and the like, wherein it is desired to insulate against vibration and simultaneously permit limited rotational and axial movements through the bushing with relatively little strain on the several parts which control the suspension activities.

In bushings of this character, it is highly desirable to control the torsional rate and deflection within predetermined limits and to independently control axial deflections of the bushings so as to accomplish the desired results.

The usual bushing of this character utilizes a single elastomeric member which, after preloading with respect to either or both of the metal sleeves, cannot provide independent deflection rates for both torsional and axial movements since only a single elastomeric part is used for this control and obviously an interrelation between the rates of deflection for various movements exists.

The present invention overcomes this defect by using independent and separate elastomeric parts, one for controlling the torsional deflection of the bushing and the other for controlling the axial deflection of the bushing. It is understood that the several elastomeric parts may have effect one upon the other, although, if desired, they may be assembled so as to be completely independent. In any event, the several elastomeric parts control to a major degree the specific deflection rate for which they are provided.

Referring to the drawings, Figure 1 shows a plan view of a bushing of the character described at 20. This bushing has a bore 22 therethrough and comprises two flanged metal sleeves 24 and 26, each having outwardly turned end flanges 28 and 30, respectively, thereon. The sleeve 24 may be termed the outer sleeve since it is of greater diameter than the sleeve 26 which is termed the inner sleeve. Between the sleeves 24 and 26 is interposed an elastomeric member 32 of annular cylindrical shape. The member 32 is preferably preloaded onto the sleeve 26, that is to say, the aperture through the member 32 in the free state is of smaller diameter than the outer diameter of sleeve 26. Likewise, the outer diameter of the member 32 in the free state is greater than the inner diameter of the outer sleeve 24. Thus, when the member 32 is placed upon the inner sleeve 26, its outer diameter is expanded and the member is in a state of preload, the outer diameter at this time is considerably larger than the inner diameter of the outer sleeve 24. As will be noted in copending application S.N. 452,755, these dimensions are fairly critical if the parts are to go together easily and are to remain together due to equalized compression at the inner and outer surfaces. When the sleeves 24 and 26 are pressed together, the member 32 is sharply compressed therebetween to fill the space and hold the sleeves in spaced relation. Under these conditions, the member 32 has some control on axial deflections between the two sleeves but more important, it controls the torsional deflections of one sleeve relative to the other.

Figure 3:
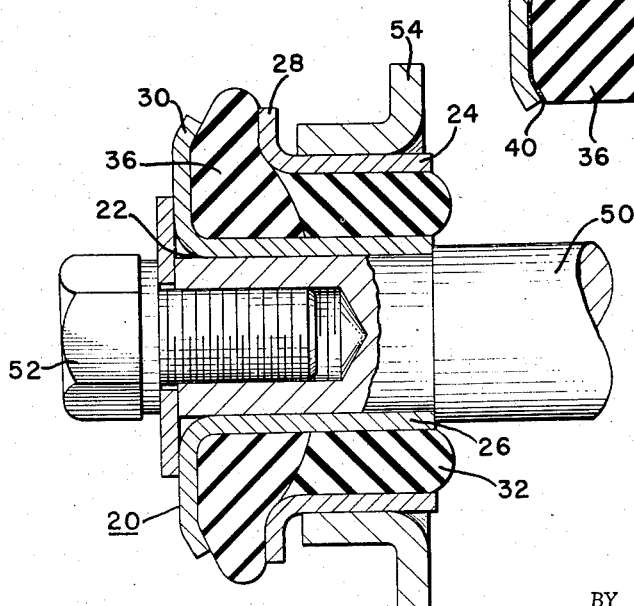
Figure 3 shows the bushing in Figure 2 after complete assembly and compression of the elastomeric portions thereof.

In order to control the axial deflection of the bushing, a second elastomeric member 36 is placed over the inner sleeve 26 so as to be interposed between the flanges 28 and 30 when the bushing is assembled. The member 36 is completely independent of the member 32 and may or may not be preloaded as desired on the inner sleeve 26. As the bushing is assembled by compression of the member 32, the member 36 is likewise compressed until the completed bushing appears as shown in Figure 3 wherein the member 36 is distorted through compression outwardly and downwardly around the sleeve 26 to further distort the member 32.

Under these conditions the elastomeric member 36 will have some control on the torsional rate of the deflection as well as on the axial rate although the major portion of the torsional control will come from the bushing 32 due to its preload at assembly. If it is desired to eliminate all torsional control by the member 36, a layer 40 of a lubricating material may be interposed during assembly between the member 36, flange 30 and sleeve 26. If desired, another lubricated layer may be interposed between the members 36 and 32 as desired.

This lubricating layer may be fabric impregnated with a lubricating compound such as graphite, it may be preformed Teflon washers, or waxed fabric, or, in fact, any material which will reduce friction to accomplish the desired result.

Figure 4:
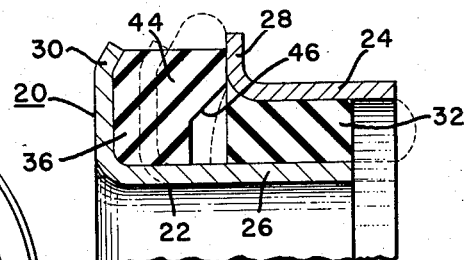
Figure 4 shows a modification of the bushing shown in Figure 2 wherein one of the elastomeric members is recessed for controlling deflection rates of the assembled bushing.
Figure 2:
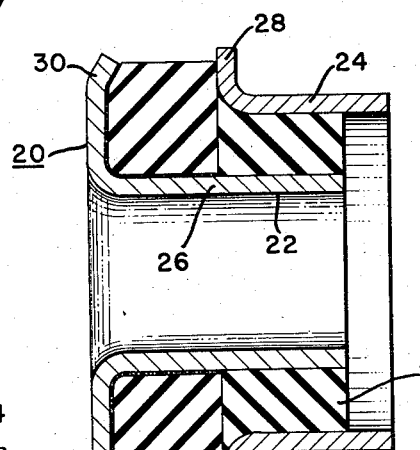
Figure 2 is a section taken on line 2—2 of Figure 1 showing the bushing in partially assembled condition.

The control of the member 36 may also be reduced with respect to torsional rates by recessing the member 36 as shown in Figure 4 wherein a member 44 is shown having a recessed portion 46 so that upon assembly of the bushing, the member 44 will assume a position shown in dotted lines in Figure 4. In this condition, the member 44 has little or no effect on the torsional deflection of the bushing, particularly if lubricated layers are utilized in juxtaposed relation to the contacting faces of the member 44 and related parts.

Bushings of this character, as previously stated, are used on control arms for assembly. A stud is shown at 50 to which the bushing is bolted by means of a bolt 52 and a control arm 54 surrounds and grips the outer shell 24. Thus, as the arm 54 moves up or down, the bushing deflects, while the stud 50 remains stationary.

It is understood that the term "elastomeric" used herein is used in its broadest sense and includes resilient material such as rubber, butadiene styrene copolymers, butadiene acrylonitrile copolymers, polychloroprenes or any compatible mixtures thereof, or, in fact, any elastomeric material which will satisfactorily dampen vibration and control rates of deflection. All of these materials are well known in the art and form no part of this invention. The basic concept of the present device is directed to a resilient bushing which may be manufactured to provide desired deflection rates for both torsional and axial movements wherein the rates may be controlled independently of one another so as to accomplish the desired result in contrast to previous devices wherein one rate is always dependent upon the other, since single elastomeric members have been used which react, one portion against the other, to vary the rates and to make them substantially uncontrollable.

It is also manifest that an adhesive cement may be used to attach more firmly the elastomer to the metal parts. Cements for adhering any of the aforementioned elastomers to metal are well known and form no part of this invention.

It is also apparent that control factors for a given bushing may be determined by the preload used at assembly and that such adjustments form no part of this invention.

While the forms of embodiment of the present invention as herein disclosed constitute preferred forms, it is to be understood that other forms might be adopted.

What is claimed is as follows:

1. A resilient bushing of the flanged head type, comprising in combination; an outwardly flanged outer metal shell, an outwardly flanged inner metal shell having an outer diameter less than the inner diameter of the outer metal shell, a preloaded elastomeric member interposed between the inner and outer metal shells and compressed so as to hold said shells together, said preloaded member controlling the torsional movement of one shell relative to the other shell, and a second independent elastomeric member surrounding the inner shell and interposed between the outwardly extending flanges on the inner and outer portions for controlling axial movements of one shell relative to the other.

2. A resilient bushing of the flanged head type, comprising in combination; an outwardly flanged outer metal shell, an outwardly flanged inner metal shell having an outer diameter less than the inner diameter of the outer metal shell, a preloaded elastomeric member interposed between the inner and outer metal shells and compressed so as to hold said shells together, said preloaded member controlling the torsional movement of one shell relative to the other shell, and a second independent elastomeric member surrounding the inner shell and interposed between the outwardly extending flanges on the inner and outer shells and held in a state of axial compression by assembly of the first mentioned elastomeric member between the inner and outer portions, said second mentioned elastomeric member acting as a control for axial movements of the inner shell relative to the outer shell.

3. The bushing as claimed in claim 1 wherein the second mentioned elastomeric member is preloaded on the inner shell.

4. The bushing as claimed in claim 1 wherein the second mentioned elastomeric member is assembled on the inner shell without preload.

5. The bushing as claimed in claim 1 wherein a lubricating layer is imposed bewteen the second mentioned elastomeric member and the metal flange on one of said sleeve members, whereby torsional movements of one of the sleeves is unaffected by the second mentioned member, whereby the first mentioned elastomeric member is the sole control for torsional movement of the bushing while the first and second mentioned elastomeric members cooperate to control axial movement of the bushing.

References Cited in the file of this patent

UNITED STATES PATENTS

| 1,733,771 | Baker | Oct. 29, 1929 |
| 1,904,931 | Rosenberg | Apr. 18, 1933 |
| 2,041,507 | Zeder | May 19, 1936 |
| 2,098,703 | Geyer | Nov. 9, 1937 |
| 2,367,697 | Stitz et al. | Jan. 23, 1945 |
| 2,785,580 | Andrews | Mar. 19, 1957 |

FOREIGN PATENTS

| 158,506 | Germany | Apr. 25, 1940 |